W. KIESER.
COMBINED STOP AND EMERGENCY VALVE.
APPLICATION FILED NOV. 2, 1907.

922,433.

Patented May 18, 1909.
2 SHEETS—SHEET 1.

Witnesses:
Lloyd C. Bush
J. Ellis Glen

Inventor
Walter Kieser.
By Albert H. Davis
Att'y.

W. KIESER.
COMBINED STOP AND EMERGENCY VALVE.
APPLICATION FILED NOV. 2, 1907.

922,433.

Patented May 18, 1909.
2 SHEETS—SHEET 2.

Witnesses:
Lloyd C. Bush
J. Ellis Glen

Inventor
Walter Kieser
By Albert G. Davis
Att'y.

UNITED STATES PATENT OFFICE.

WALTER KIESER, OF BERLIN, GERMANY, ASSIGNOR TO GENERAL ELECTRIC COMPANY, A CORPORATION OF NEW YORK.

COMBINED STOP AND EMERGENCY VALVE.

No. 922,433.     Specification of Letters Patent.      Patented May 18, 1909.

Original application filed April 3, 1906, Serial No. 309,688. Divided and this application filed November 2, 1907. Serial No. 400,345.

*To all whom it may concern:*

Be it known that I, WALTER KIESER, a citizen of Switzerland, residing at Berlin, Germany, have invented certain new and useful Improvements in Combined Stop and Emergency Valves, of which the following is a specification.

This application is a division of my application, Serial No. 309,688, filed April 3, 1906, and relates to a combined stop and emergency valve which is operated by hand when under normal conditions it is desired to open it, vary the amount of its opening or close it to shut down or stop the turbine or other prime mover which is being supplied with motive fluid through the valve. The valve is also provided with mechanism by which it is automatically and quickly closed under emergency conditions and readily reset in normal position after such action.

The object of the invention is the provision of an improved valve of the type described which is simple in structure and efficient and certain in its operation.

Figure 1:
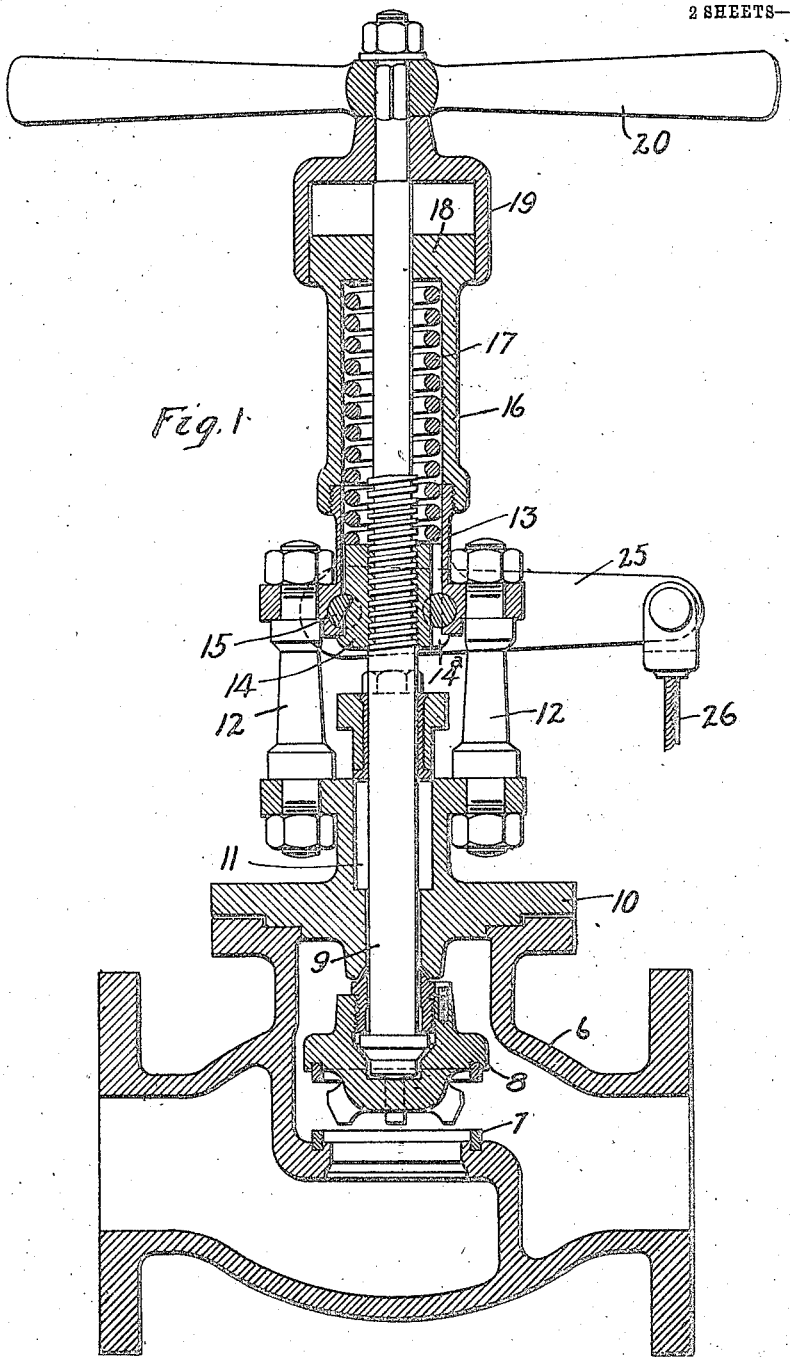
Figure 2:
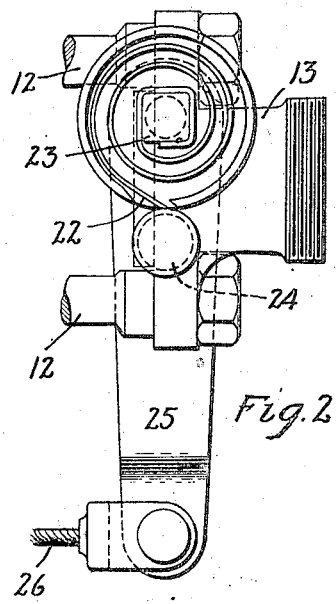
Figure 3:
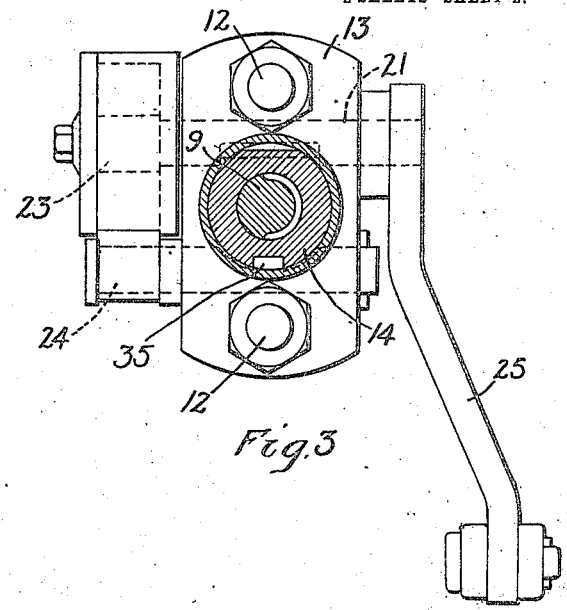
Figure 4:
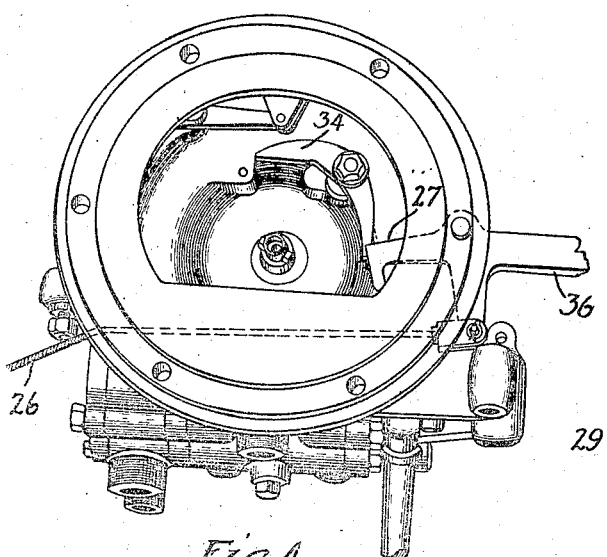
Figure 5:
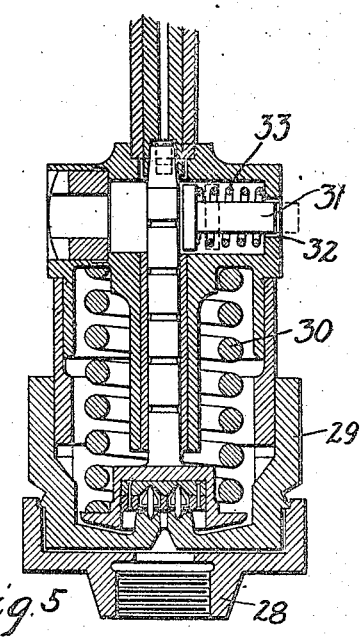

In the accompanying drawings illustrating one of the embodiments of the invention, Figure 1 is a central section through the valve; Fig. 2 is a detail view showing the spring for releasing the lock or latch when an emergency arises; Fig. 3 is a section through the nut and valve spindle of Fig. 1; Fig. 4 is a perspective view looking into the casing which surrounds the emergency governor tripping mechanism; and Fig. 5 is an axial section of the normal and emergency governors.

The valve body or casing 6 has a diaphragm 7 which divides the interior of the casing into two chambers. The diaphragm is provided with a valve seat 7 and the passage of fluid through this seat from one chamber to the other is controlled by a valve 8 rotatably mounted on the lower end of the valve spindle 9. Secured to the upper portion of the casing is a flanged cover 10 provided with a suitable stuffing-box 11 which prevents leakage outward along the stem. Two pillars 12 are attached to the upper portion of the cover, one on either side of the stem. The upper ends of the pillars support a casing 13 within which the nut 14 is mounted for sliding movement but is normally held against such movement by the latch or lock 15 in contact with a suitable notch or shoulder in the side of the nut. This nut engages the threaded portion of the valve stem and has a flange or shoulder 14ª which limits its upward movement due to the rotation of the stem.

A cylindrical casing 16 is attached by a threaded joint to the upper end of the casing 13. The valve stem passes centrally through the two members 13 and 16, and in the space between the stem and the inner walls of the casing is located a compression spring or motor 17 which bears at its lower end against the nut 14 and at its upper end against the head 18 that closes one end of the chamber within the casing 16. The outer portion of the head 18 forms a piston which is in sliding engagement with the bore of the cylinder 19 secured on the upper end of the stem 9, the cylinder and piston thus forming a dash-pot for cushioning the sudden closing movement of the valve and stem when released. A handle or hand-wheel 20 is attached to the valve stem above the cylinder 19 for opening and closing the valve by hand and resetting the emergency device.

The latch or lock 15 is formed on a rock-shaft 21 mounted in the casing 13. One end of a clock spring 22 is secured to the square end 23 of the shaft 21, the other end of the spring being attached to a pin 24 projecting from the face of the casing 13. The tendency of this spring at all times is to turn the shaft 21 and release the lock 15 from engagement with the nut. When so released the nut is forced downward by the spring 17, carrying with it the stem 9 and the valve 8 and quickly cutting off the supply of motive fluid. The lock is held in the position shown in Fig. 1 by means of an arm 25 attached to one end of the shaft 21 and a wire rope or other connection 26 leading from the outer end of the arm to a latch 27 mounted on the casing of the turbine or other prime mover adjacent the governing mechanism. When the mechanism is operating normally the latch 27 occupies the position shown in Fig. 4 and the rope or other connection 26 holds the arm 25 in the position shown in Fig. 1 against the turning action of the spring 22.

The normal speed governor consists of a disk 28 which is attached to and rotates with one of the constantly rotating members of the prime mover. This disk carries two suitably mounted centrifugally acting weights 29 which move outward under an increase in speed against the opposing action of the spring 30 and by means of suitable connections and a valve or valves control the quantity of motive fluid used in the apparatus. Mounted in the upper portion of the casing which surrounds and supports the spring 30 is a pin 31. This pin tends to move outward through the opening 32 in the casing when the speed of rotation increases. Its outward movement is opposed by the action of the spring 33 but under the influence of an abnormal increase in speed which would tend to damage the apparatus the pin moves to the position shown in dotted lines, Fig. 5, and as it revolves strikes the end of the lever 34 which normally holds the latch 27 in the position shown in Fig. 4. The movement of the lever 34 by the pin 31 releases the latch 27. The clock spring 22 is then free to turn the lock or latch 15 and release the nut 14 and valve 8 to the action of the spring 17, Fig. 1.

The nut 14 is prevented from turning by means of the spline 35. When the nut is held in the position shown in Fig. 1, the valve 8 may be raised or lowered by turning the stem 9 in the nut by means of the handle 20. After the valve has been closed under emergency conditions in the manner above described, the nut is returned to its normal position, Fig. 1, by rotating the threaded stem 9 without raising the valve 8 from its seat. The movement of the nut also compresses the spring 17. The arm 25 is then turned to engage the lock 15 with the nut and secured in this position by the engagement of the latch 27 with the end of the lever 34, the movement of the latch being transmitted to the arm 25 by the rope 26. To facilitate the latter operation the latch 27 is provided with a suitable handle 36. The attendant grasps the handle and by a single movement brings both the latch and lever and the lock and nut into normal position. The machine may then be started up again by turning the handle 20 to raise the valve 8, thus admitting steam or other motive fluid thereto. Obviously, the arm 25 may be connected to other tripping devices than the particular type shown. This device is merely illustrative of one of numerous possible applications of the invention. The valve will operate equally well with its stem in a horizontal or any other position than the vertical one chosen for the drawings.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a valve body, a valve located therein, a stem on which the valve is mounted, a wheel for opening and closing the valve, a motor external to the body for closing the valve under certain conditions, a device normally restraining the motor from operating, means for releasing said device, and means actuated by the wheel for restoring the motor to operative condition.

2. In combination, a valve body, a valve therein, a stem on which the valve is mounted, a wheel coöperating with the stem for opening and closing the valve under normal conditions, a motor exterior to the body for forcibly moving the valve to close it under certain conditions, a device normally restraining the motor from operating, means for releasing said device, and means actuated by the wheel for restoring the motor to operative condition.

3. In combination, a casing or body, a valve located therein, a stem for the valve, a motor for forcibly moving the valve to close it under certain conditions, means for resetting the motor, and a wheel on the stem for rotating it in one direction to cause said means to reset the motor, and for rotating it in either direction after the motor is reset to open or close the valve.

4. The combination of a valve body, a valve located therein, a valve stem having a threaded portion, a nut engaging the threads on the stem, a potentially energized motor for moving the nut and stem longitudinally to close the valve, a lock normally restraining the movement of the nut by the motor, a device for releasing the nut from the lock, and means for rotating the stem.

5. In combination, a casing or body, a valve located therein, a threaded valve stem, a nut coöperating with the stem and through which it passes, a lock normally restraining the nut against longitudinal movement, a motor for forcibly moving the nut and stem when the lock is released to close the valve, and a handle on the stem for rotating it to reset the motor and nut in normal position and to open and close the valve after they have been reset.

6. The combination of a valve body, a valve located therein, a valve stem having a threaded portion, a casing mounted on the body and through which the stem passes, a nut mounted for longitudinal movement in the casing and in engagement with the threaded portion of the stem, an abutment, a spring between the abutment and the nut which tends to move the nut longitudinally, a lock on the casing which holds the nut against the action of the spring, a device for moving the lock to release the nut, and means for rotating the stem.

7. In combination, a valve body, a valve located therein, a valve stem having a threaded portion, a casing mounted on the body and through which the stem passes, a nut mounted in one end of the casing which engages the threaded portion of the stem, a sliding connection between the nut and the casing, a shoulder on the nut which limits its movement in one direction, an abutment on the casing, a compression spring between the abutment and the adjacent end of the nut, a lock on the casing for holding the nut against the action of the spring, a device for releasing the lock, and a handle for rotating the stem.

8. In combination, a valve body, a valve located therein, a valve stem having a threaded portion, a nut engaging the threaded portion of the stem, a motor for forcibly moving the nut and stem to close the valve, a lock normally restraining the movement of the nut by the motor, a device for releasing the nut from the lock, a dash-pot for cushioning the closing movement of the valve when the nut is released, and means for rotating the stem.

9. In combination, a valve body, a valve located therein, a valve stem having a threaded portion, a casing mounted upon the body and through which the stem passes, a nut slidably mounted in one end of the casing and coöperating with the threaded portion of the stem, a spring surrounding the stem within the casing and engaging one end of the nut, an abutment on the casing in contact with the other end of the spring, a lock for the nut mounted on the casing, means for releasing the lock, a piston formed on the casing, a cylinder attached to the stem in which the piston slides, the piston and cylinder forming a dash-pot to cushion the closing movement of the valve when the lock is released, and a wheel for rotating the stem.

10. In combination, a casing or body, a valve located therein, a stem for the valve, a means for operating it under normal conditions, a spring for closing the valve under emergency conditions, a device for holding the spring in condition for action, and a locking means for restraining said device.

11. In combination, a casing or body, a valve located therein, a spring which when released closes the valve, means for restraining the spring, a motor which tends at all times to move said means in a direction to cause it to release the spring, a latch restraining the motor, and a speed responsive device which releases the latch under certain predetermined conditions.

12. In combination, a casing or body, a valve located therein, a lock holding the valve in any given position, a spring which when released from restraint closes the valve, a means restraining the spring, a governor responsive to load changes for releasing said means, and a motor which performs the work of moving said means when released by the governor.

13. In combination, a valve body, a valve located therein, a casing secured to the body, a valve stem having a threaded portion, a nut slidably mounted in the casing and coöperating with the threaded portion of the stem, a motor tending to move the nut longitudinally, a rock shaft journaled in the casing adjacent the nut, a lock on the rock shaft which engages the nut to hold it against longitudinal movement, a spring which tends to turn the shaft to release the nut from the lock, means restraining the action of the spring under normal conditions, a device which under emergency conditions acts on said means to permit the spring to operate, and a wheel for rotating the stem.

14. The combination of a valve body, a valve located therein, a stem for the valve having a threaded portion, a member mounted on the body through which the stem passes, a nut mounted for longitudinal movement in said member which is in engagement with the threaded portion of the stem, a motor for moving the nut and stem longitudinally to close the valve, a lock mounted on said member which normally engages the nut and restrains the movement of the stem and nut by the motor, a device for disengaging the lock and the nut under certain conditions to permit the motor to close the valve quickly, and means for rotating the stem to open and close the valve more slowly under normal conditions.

15. The combination of a valve body, a valve located therein, a valve stem having one of its ends rotatably connected with the valve, a stuffing box on said body, the stem passing outwardly through said box and having a threaded portion beyond it, a member mounted on the body through which the outer portion of the stem passes, a nut mounted for longitudinal movement in the member which engages the threaded portion of the stem, a motor for moving the stem and nut longitudinally to close the valve, means for limiting the outward movement of the nut, a lock pivotally mounted on said member which normally engages the nut and holds it against inward movement, a device for disengaging the nut and lock under certain conditions to permit the motor to close the valve quickly, and a wheel for rotating the stem to reset the nut when it is desired to restore the valve to normal condition and to open and close the valve more slowly when said condition is restored.

In witness whereof, I have hereunto set my hand this 5th day of October, 1907.

WALTER KIESER.

Witnesses:
FRIEDRICH GANZERT,
LUDWIG CÜBEIC.